United States Patent
Lee et al.

(10) Patent No.: US 9,342,200 B2
(45) Date of Patent: May 17, 2016

(54) TOUCH PANEL INCLUDING A SENSOR PART TO CONTROL A CURSOR

(71) Applicant: LG INNOTEK CO., LTD., Seoul (KR)

(72) Inventors: Kyung Nam Lee, Seoul (KR); Doo Sun Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 105 days.

(21) Appl. No.: 14/138,999

(22) Filed: Dec. 23, 2013

(65) Prior Publication Data

US 2014/0176831 A1 Jun. 26, 2014

(30) Foreign Application Priority Data

Dec. 21, 2012 (KR) .......................... 10-2012-0151157

(51) Int. Cl.
*G06F 3/044* (2006.01)
*G06F 3/0487* (2013.01)
*G06F 1/16* (2006.01)
*G06F 3/0481* (2013.01)

(52) U.S. Cl.
CPC .............. *G06F 3/044* (2013.01); *G06F 1/1626* (2013.01); *G06F 1/1643* (2013.01); *G06F 1/1684* (2013.01); *G06F 1/1694* (2013.01); *G06F 3/0481* (2013.01); *G06F 3/0487* (2013.01); *G06F 2200/1637* (2013.01); *G06F 2203/04101* (2013.01); *G06F 2203/04106* (2013.01); *G06F 2203/04108* (2013.01)

(58) Field of Classification Search
CPC ................ G06F 3/03547; G06F 3/041–3/047; G06F 2203/04101; G06F 2203/04108; G06F 3/0481; G06F 3/04812; G06F 2200/1637
See application file for complete search history.

(56) References Cited

U.S. PATENT DOCUMENTS

| | | | |
|---|---|---|---|
| 7,161,578 B1 * | 1/2007 | Schneider | G02B 27/20 345/156 |
| 2003/0201982 A1 * | 10/2003 | Iesaka | G06F 1/1616 345/168 |
| 2010/0058211 A1 * | 3/2010 | Lee | G06F 1/1624 715/764 |
| 2011/0255000 A1 * | 10/2011 | Weber et al. | B23K 26/0003 348/374 |
| 2012/0212432 A1 * | 8/2012 | Murata et al. | G06F 3/044 345/173 |
| 2012/0325639 A1 * | 12/2012 | Scuderi et al. | G06F 3/044 200/600 |

* cited by examiner

*Primary Examiner* — Larry Sternbane
(74) *Attorney, Agent, or Firm* — Saliwanchik, Lloyd & Eisenschenk

(57) ABSTRACT

Disclosed is a touch panel including a cover window including an active area and an unactive area, and a first sensor part provided on the unactive area to control movement of a cursor on the active area.

8 Claims, 4 Drawing Sheets

TOUCH PANEL INCLUDING A SENSOR PART TO CONTROL A CURSOR

CROSS-REFERENCE TO RELATED APPLICATION

This application claims the benefit under 35 U.S.C. §119 of Korean Patent Application No. 10-2012-0151157, filed Dec. 21, 2012, which is hereby incorporated by reference in its entirety.

BACKGROUND

The embodiment relates to a touch panel.

Recently, a touch panel, which performs an input function through the touch of an image displayed on a display device by an input device such as a stylus pen or a finger, has been applied to various electronic appliances The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In other words, the touch panel detects the position of a touch due to the variation in capacitance only when the input device such as the finger of a user is touched on the touch panel.

However, when the input device such as the finger of the user cannot be inevitably used, or when the use of the input device is restricted similarly to the case that the user puts on gloves, the input device cannot directly touch the touch panel, so that the touch panel cannot be driven.

Accordingly, there is required a touch panel capable of detecting the position of a touch on the touch panel even if the use of the input device is restricted.

BRIEF SUMMARY

The embodiment provides a touch panel that can be driven through various input schemes.

According to the embodiment, there is provided a touch panel including a cover window including an active area and an unactive area, and a first sensor part provided on the unactive area to control movement of a cursor on the active area.

As described above, the touch panel according to the embodiment may detect a position by the movement of the touch panel and the sensor without direct touch on the active area of the touch panel.

In other words, the touch panel according to the embodiment can drive the touch panel by moving and driving the cursor by the first and second sensors after displaying the cursor on the active area, that is, the display area by the third sensor.

Therefore, according to the touch panel input method of the embodiment, even if the use of the hand of a user is inevitably restricted, or impossible, the required position of the touch panel can be detected without the direct touch.

DETAILED DESCRIPTION

Figure 1:
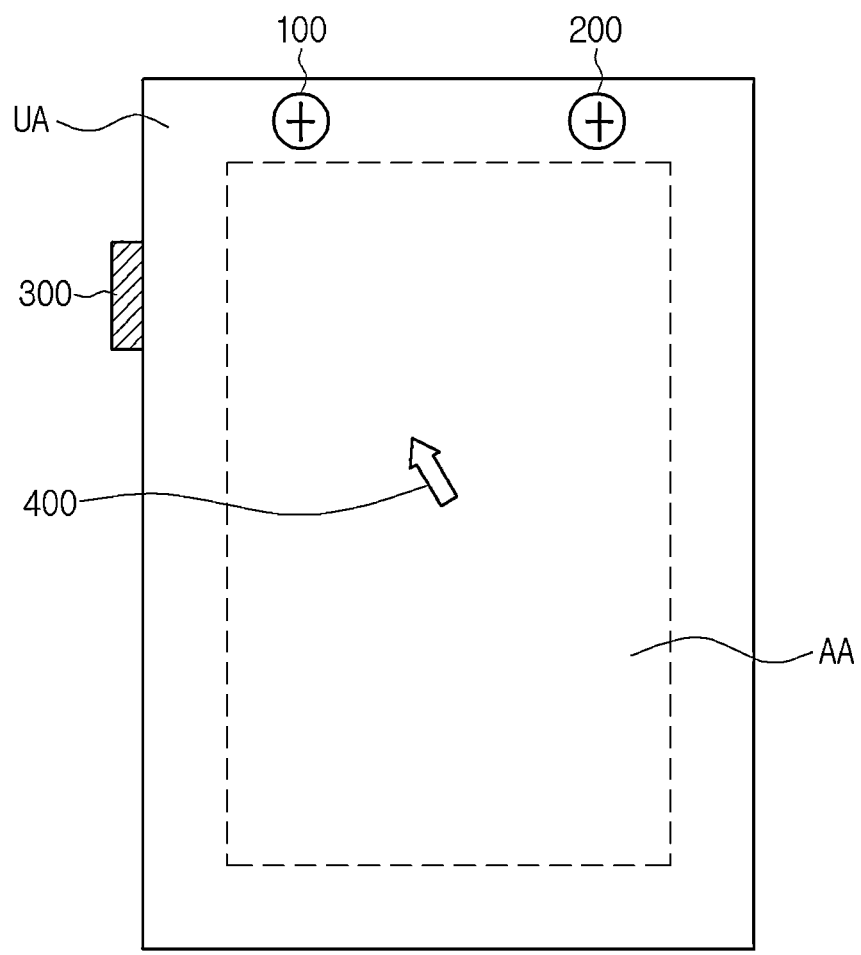
FIG. 1 is a schematic plan view showing a touch panel according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer (or film), each region, each pattern, or each structure shown in the drawings may be exaggerated, omitted or schematically drawn for the purpose of convenience or clarity. In addition, the size of the layer (or film), the region, the pattern, or the structure does not utterly reflect an actual size.

Hereinafter, the embodiment will be described in detail with reference to accompanying drawings.

Hereinafter, a touch panel according to the embodiment will be described with reference to FIGS. 1 to 4.

The touch panel according to the embodiment may include a cover window and/or a substrate.

The cover window may include glass or plastic. For example, the cover window may include tempered glass, half-tempered glass, sodalime glass, reinforced plastic, or flexible plastic.

The cover window may include an active area AA and the unactive area UA. The active area AA refers to an area through which a touch instruction may be input by a user. In other words, the active area AA may be a display area. To the contrary to the active area AA, the unactive area UA signifies an area to which the touch instruction is not input because the unactive area UA is not activated even if the touch of the user is input thereto In addition, the substrate may include plastic. For example, the substrate may include polyethylene terepthalate (PET). Similarly to the cover window, the substrate may include an active area and an unactive area.

Electrodes and sensor parts may be provided in the active areas and the unactive areas of the cover window and/or the substrate.

The active and unactive areas are provided therein with sensing and wire electrodes, respectively.

In detail, the active area may be provided therein with the sensing electrode. In other words, first and second sensing electrodes may be provided on the cover window or one surface of the substrate. The first and second sensing electrodes may be provided while extending in directions different from each other. In detail, the first sensing electrode extending in one direction and the second sensing electrode extending in a direction different from the direction that the first sensing electrode extends may be provided on the active area of the cover window.

The first and second sensing electrodes may include a conductive material. For example, the first and second sensing electrodes may include a transparent conductive material such as indium tin oxide (ITO).

In addition, the unactive area may be provided therein with the wire electrode. In detail, the wire electrode may include a first wire electrode connected with the first sensing electrode and drawn out of the first sensing electrode and a second wire electrode connected with the second sensing electrode and drawn out of the second sensing electrode.

The first and second wire electrodes may include a metallic material. For example, the first and second wire electrodes may include a metallic material such as silver (Ag) or copper (Cu).

The touch panel according to the embodiment may be provided at various types depending on the positions where the sensing and wire electrodes are provided.

For example, both of the first and second sensing electrodes may be provided on one surface of the cover window.

Alternatively, the first sensing electrode may be provided on one surface of the cover window, and the second sensing electrode may be provided on one surface of the substrate provided on the cover window.

Alternatively, the first sensing electrode may be provided on a first substrate provided on the cover window, and the second sensing electrode may be provided on a second substrate provided on the first substrate.

The sensor parts may be provided on the unactive area. In detail, the unactive area may be provided thereon with a first sensor part 100, a second sensor part 200, and a third sensor part 300. In this case, the first and second sensor parts 100 and 200 may be provided at an inner portion of the touch panel, and the third sensor part 300 may be provided at an outer portion of the touch panel.

The first and second sensor parts 100 and 200 may control the movement of a cursor 400. In addition, the third sensor part 300 may control the display of the cursor 400 displayed on the active area.

The third sensor part 300 may control the display of the cursor 400. In detail, the third sensor part 300 may turn on or turn off the cursor 400. In detail, when the third sensor part 300 is turned on, the cursor 400 may be displayed on the active area AA. When the third sensor part 300 is turned off, the cursor 400 may not be displayed on the active area AA.

The third sensor part 300 may include a gyro sensor. The third sensor part 300, that is, the gyro sensor may detect the motion of the cover window, that is, the up, down, left, and right positions of the cover window.

The first sensor part 100 may move the position of the cursor 400. In detail, the cursor 400 displayed on the active area of the cover window may be moved up, down, left, and right by the first sensor part 100.

Figure 2:
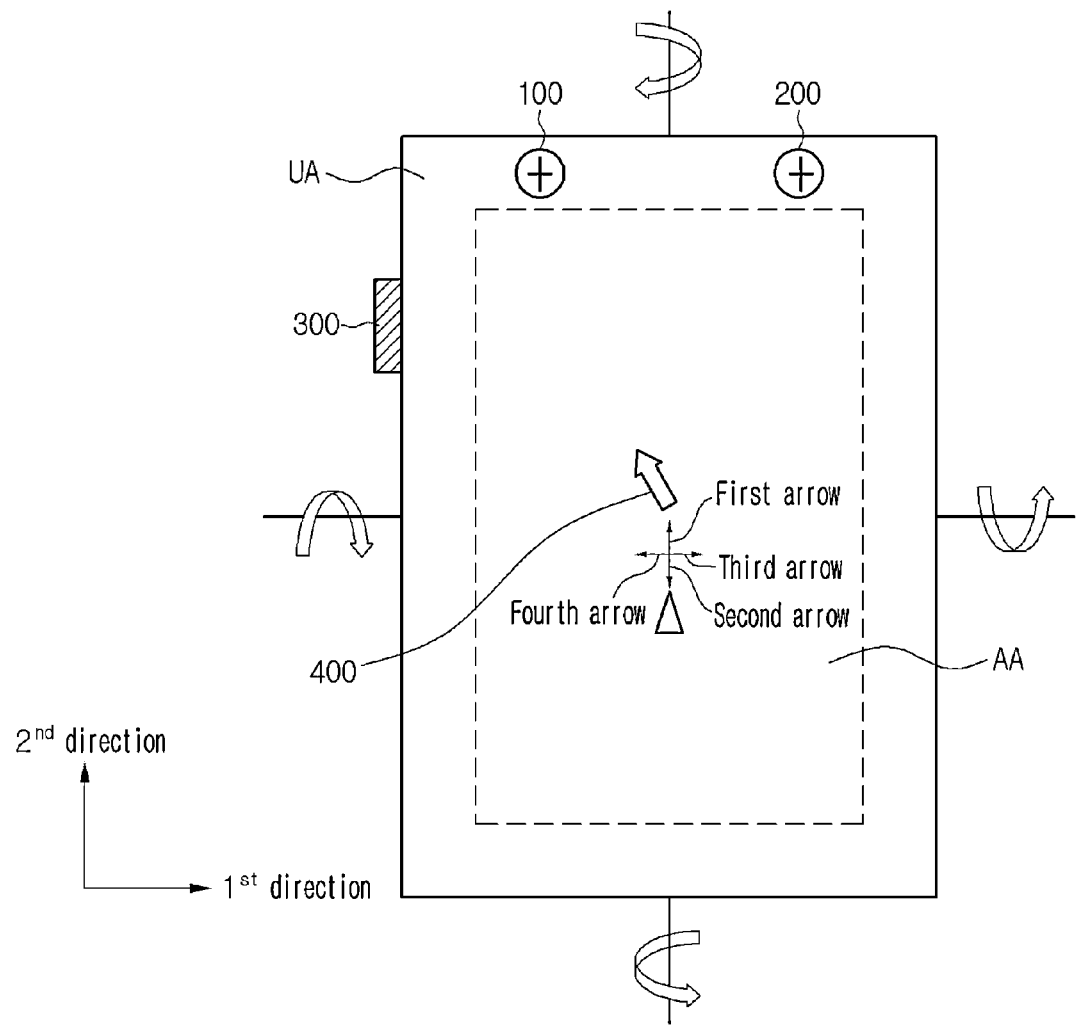
FIGS. 2 to 4 are plan views to explain an input scheme of a touch panel according to the embodiment.

As shown in FIG. 2, the arrow may be defined by a first to fourth arrow. Also, the first arrow may be defined by a "moves up", the second arrow may be defined by a "moves down", the third arrow may be defined by a "moves right", the fourth arrow may be defined by a "moves left". In other words, the cursor 400 can be moved in a direction of the first to fourth arrow by the first sensor part 100.

As shown in FIG. 2, the position of the cursor 400 may be moved in a direction the same as a movement direction of the touch panel within the active area along the direction in which the touch panel is moved.

In other words, when the touch panel is inclined in a left direction or a right direction, the first sensor part 100 detects the movement of the touch panel, so that the cursor 400 displayed on the active area may be moved in the direction the same as the movement direction of the touch panel, that is, the left direction or the right direction.

In addition, when the touch panel is inclined in an upper direction or a lower direction, the first sensor part 100 detects the movement of the touch panel, so that the cursor 400 displayed on the active area may be moved in the direction the same as the movement direction of the touch panel, that is, the upper direction or the lower direction.

Accordingly, the cursor 400 may be moved on the active area in the direction the same as the movement direction of the touch panel by the first sensor part 100 to detect the movement of the touch panel.

The second sensor part 200 may detect a distance from an object approaching the active area. For example, the second sensor part 200 may include at least one of an infrared sensor, an ultrasonic sensor, and an illuminance sensor.

If the second sensor part 200 includes an infrared sensor or an ultrasonic sensor, the second sensor part 200 may detect the movement of the object to cut off the path of the infrared light or the ultrasonic wave in the state that the infrared light or the ultrasonic wave is irradiated. In other words, if the propagation of the infrared light or the ultrasonic wave is cut off at a specific point on the display by the object approaching the active area in the state that the infrared light or the ultrasonic wave is irradiated, the second sensor part 200 may detect the position of the object by detecting the information of the position of the point in which the infrared light or the ultrasonic wave is cut off.

In addition, if the second sensor part 200 includes an illuminance sensor, the second sensor part 200 may detect the movement of the object according to the variation in the brightness of light as the object approaches the touch panel.

Figure 3:
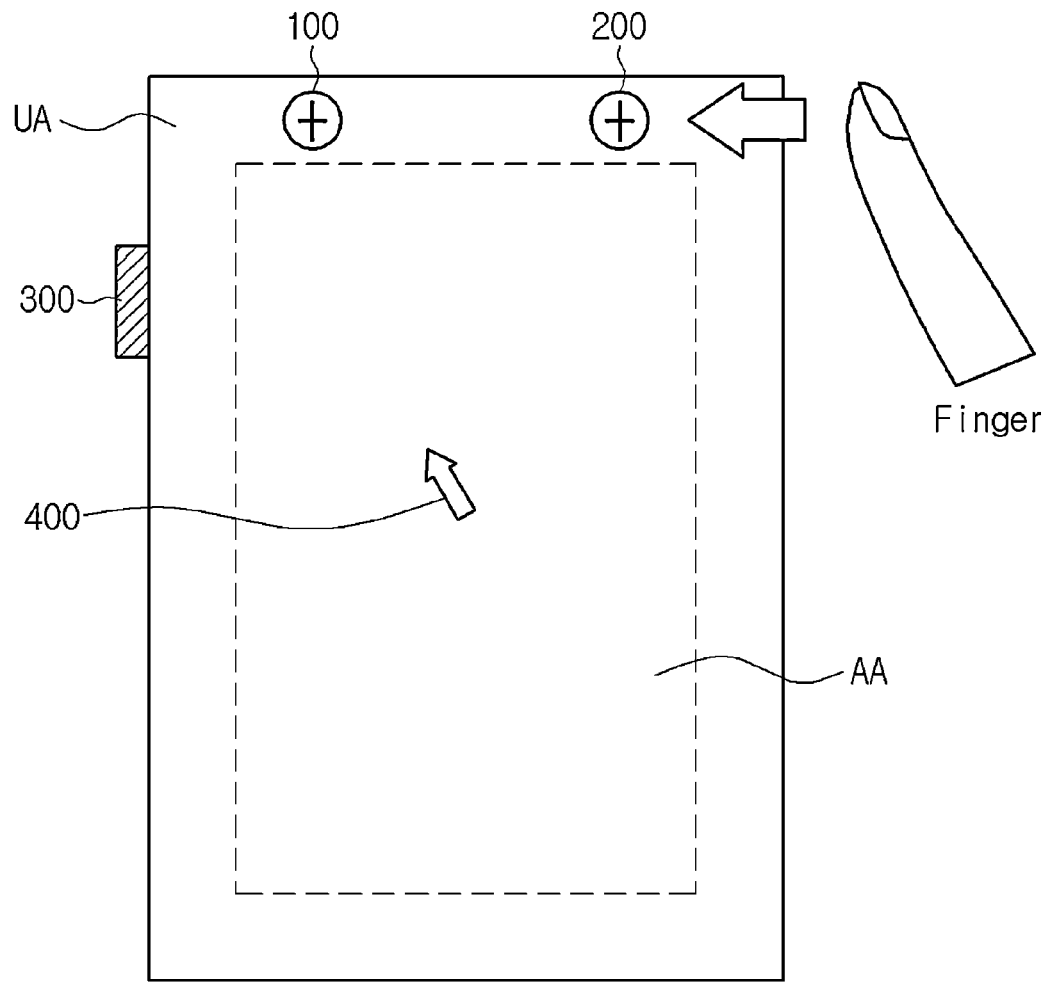
Figure 4:
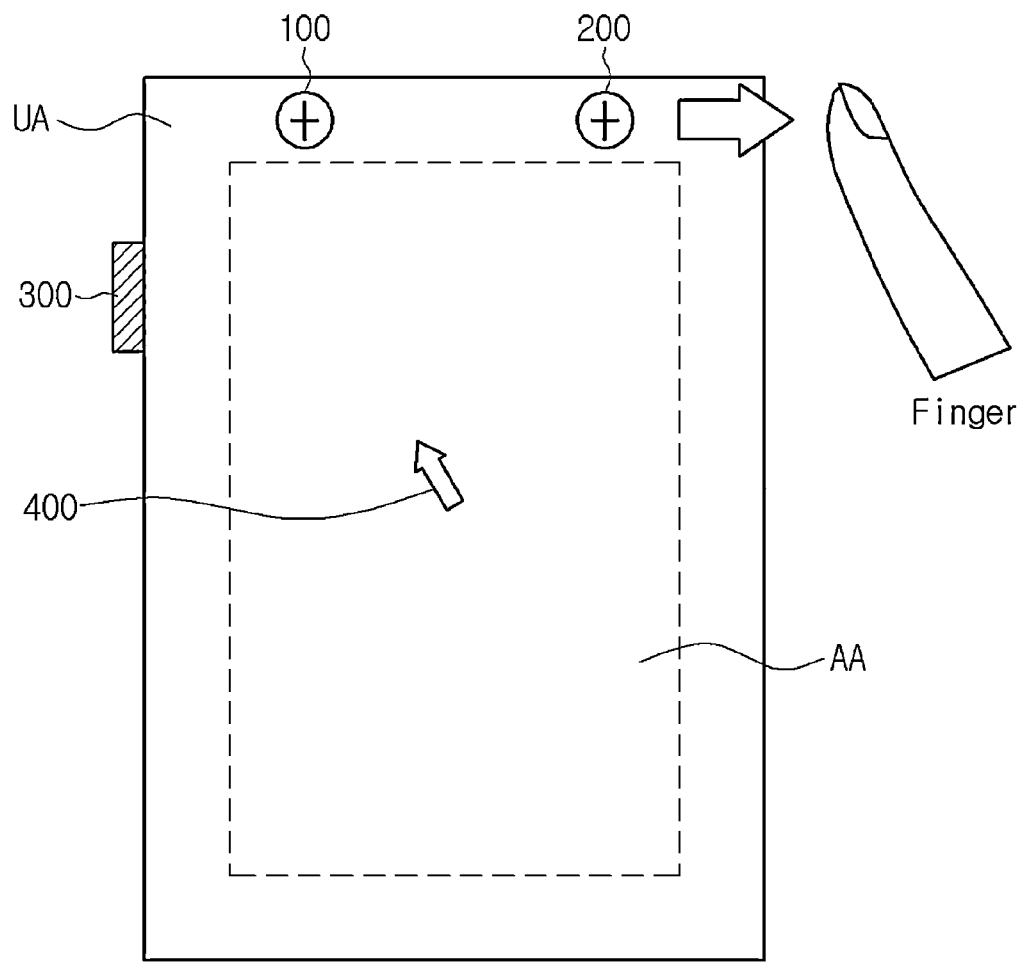

The second sensor part 200 may drive the cursor 400. In detail, as shown in FIG. 3, when the object approaches to the second sensor part 200 by a critical distance from the active area, the cursor 400 may be in an input state. In addition, as shown in FIG. 4, the object does not approach the second sensor part 200, or the object is away from the second part 200 beyond the critical distance from the active area, the cursor 400 may be in a non-input state.

In other words, if the cursor 400 is in the input state, the input device may be recognized as being touched to the active area of the touch panel. Accordingly, the variation in the capacitance may occur at the part where the cursor is positioned, and the part may be detected as a touch position.

Accordingly, the cursor may serve as the input device. In other words, the cursor may be moved on the active area AA by the first sensor part 100, and driven in the input state or the non-input state on the active area AA by the second part 200.

Therefore, in the touch panel according to the embodiment, the variation in the capacitance may occur as the active area is touched by the first sensor part 100, the second sensor part 200, the third sensor part 300, and the cursor 400. Accordingly, even if the use of the user is inevitably restricted, or the user puts on the gloves, so that the input device does not touch the active area, the touch panel can be driven by the cursor 400 of the touch panel.

Hereinafter, a touch panel input method will be described by using a touch panel according to the embodiment.

The touch panel input method of the embodiment may include a step of displaying a cursor, a step of moving the cursor, and a step of detecting the position of the cursor.

In the step of displaying the cursor, the cursor may be displayed on the active area of the touch panel.

In other words, the cursor may be displayed on the active area of the touch panel. The cursor may be displayed by using an additional on-off function of the touch panel. In the on state, the cursor may be displayed on the active area. In the off state, the cursor may be disappeared on the active area.

Thereafter, in the step of moving the cursor, the cursor may be moved to the required position on the active area by moving up, down, left, or right the touch panel. In other words, the movement of the touch panel and the movement of the cursor displayed on the active area may have the mutual relationship therebetween.

In detail, when the touch panel is moved up or down, the cursor on the active area may be moved up and down on the active area. In addition, when the touch panel is moved left or right, the cursor on the active area may be moved left or right on the active area.

The mutually relative movement of the touch panel and the cursor may be realized by a gyro sensor included in the touch panel. The gyro sensor detects and measures the translation and the rotation of the touch panel, thereby calculating the movement distance and the directional information of the touch panel. In addition, after the gyro sensor calculates the movement distance and the directional information and transmits a signal to a first control unit, the cursor may be moved on the active area in the direction the same as the movement direction of the touch panel by the first control unit.

Thereafter, in the step of detecting the position of the cursor, the point where the cursor is positioned on the active area may be detected.

The step of detecting the position of the cursor includes allowing an object to approach an upper portion of the active area, detecting if the object approaches the touch panel within the critical distance, transmitting a predetermined signal, which notifies the approach of the object within the critical distance, to a control unit if the object approaches the touch panel within the critical distance, and calculating the position of the cursor on the active area.

When allowing an object to approach the upper portion of the active area, an input device such as a hand or other objects may approach the upper portion of the active area. In detail, the touch panel may be provided at an upper end or a lower end thereof with a sensor part to detect the approach of the object. For example, the touch panel may be provided at the upper end or the lower end thereof with at least one of an infrared sensor, an ultrasonic wave sensor, and an illuminance sensor. Accordingly, in the step of allowing the object to approach the upper portion of the active area, the object can approach an upper portion of the sensor part.

When detecting if the object approaches the touch panel within the critical distance, the sensor part may detect the distance between the object and the touch panel. In other words, if the object approaches the upper portion of the sensor part, the sensor part may detect the distance between the object and the touch panel.

For example, if the sensor part includes an infrared sensor, or an ultrasonic sensor, in the state that the infrared sensor or the ultrasonic sensor irradiates the infrared light or the ultrasonic wave, the distance between the object and the touch panel can be calculated based on the cut-off rate of the path of the infrared light or the ultrasonic wave. In addition, when the sensor part includes an illuminance sensor, the distance between the object and the touch panel can be calculated based on the cut-off rate of the path of the illuminance sensor.

When transmitting the predetermined signal, which notifies the approach of the object within the critical distance, to a control unit if the object approaches the touch panel within the critical distance, if the distance between the object and the touch panel detected by the infrared sensor, the ultrasonic sensor, or the illuminance sensor is within the critical distance, the predetermined signal to the second control unit.

In other words, if the distance between the object and the touch panel measured by the sensor part is within the critical distance, the sensor part may transmit a signal value for the position of the cursor to the second control unit.

Thereafter, when calculating the position of the cursor on the active area, the second control unit may calculate the position of the cursor based on the received signal. In other words, the second control unit receives a signal for the position of the cursor from the sensor part.

Therefore, the second control unit may calculate the position of the cursor located on the active area so that the cursor located on the active area may perform an input operation on the active area.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
    a cover window comprising an active area and an unactive area; and
    a sensor part provided on the unactive area to control movement of a cursor on the active area;
        wherein the sensor part includes a first sensor part, a second sensor part, and a third sensor part;
        wherein the first sensor part moves a position of the cursor;
        wherein the second sensor part drives the cursor;
        wherein the third sensor part turns on or turns off the cursor;
        wherein, when an object approaches the second sensor part within a critical distance from the active area, the cursor is in an input state;
        wherein the cursor is displayed on the active area; and
        wherein, when the cursor is in the input state, the object is recognized as touching the active area.

2. The touch panel of claim 1, wherein the first sensor part moves the cursor to a required position as the touch panel moves up, down, left or right.

3. The touch panel of claim 1, wherein the first sensor part comprises a gyro sensor.

4. The touch panel of claim 1, wherein the second sensor part comprises at least one of an infrared sensor, an ultrasonic sensor, and an illuminance sensor.

5. The touch panel of claim 1, further comprising a first sensing electrode provided on the active area of the cover window while extending in one direction; and
    a second sensing electrode provided on the active area of the cover window while extending in a direction different from the one direction that the first sensing electrode extends.

6. The touch panel of claim 5, wherein the first and second sensing electrodes comprise indium tin oxide (ITO).

7. The touch panel of claim 1, further comprising:

a substrate on the cover window;
a first sensing electrode provided on the cover window while extending in one direction; and
a second sensing electrode provided on the substrate while extending in a direction different from the one direction that the first sensing electrode extends.

8. The touch panel of claim 1, further comprising:
a first substrate on the cover window;
a second substrate on the first substrate;
a first sensing electrode provided on the first substrate while extending in one direction; and
a second sensing electrode provided on the second substrate while extending in a direction different from the one direction that the first sensing electrode extends.

\* \* \* \* \*